United States Patent [19]

Anderson et al.

[11] 4,186,871

[45] Feb. 5, 1980

[54] TRANSACTION EXECUTION SYSTEM WITH SECURE ENCRYPTION KEY STORAGE AND COMMUNICATIONS

[75] Inventors: Robert W. Anderson, Morgan Hill; Steven F. Brock; May L. Gee, of San Jose, all of Calif.

[73] Assignee: International Business Machines Corporation, Armonk, N.Y.

[21] Appl. No.: 882,529

[22] Filed: Mar. 1, 1978

[51] Int. Cl.² .......................... G06K 5/00; H04Q 3/54
[52] U.S. Cl. ................................. 235/380; 340/149 A
[58] Field of Search .......................... 235/379, 380, 381; 340/149 A, 152 R; 179/2 DP; 364/406

[56] References Cited

U.S. PATENT DOCUMENTS

| | | | |
|---|---|---|---|
| Re. 29,057 | 11/1976 | Enikeieff | 340/149 A |
| 3,212,062 | 10/1965 | Goldman | 340/149 A |
| 3,456,242 | 7/1969 | Lubkin | 340/172.5 |
| 3,727,186 | 4/1973 | Stephenson | 340/149 A |
| 3,764,742 | 10/1973 | Abbott | 178/22 |
| 3,786,420 | 1/1974 | Stambler | 340/149 A |
| 3,787,623 | 1/1974 | Stephenson | 340/149 A |
| 3,821,704 | 6/1974 | Sabsay | 340/149 A |
| 3,833,885 | 9/1974 | Gentile | 340/149 A |
| 3,931,497 | 1/1976 | Gentile | 340/149 A |
| 3,937,925 | 2/1976 | Boothroyd | 340/152 R |
| 3,938,091 | 2/1976 | Atalla | 340/149 A |
| 3,956,615 | 5/1976 | Anderson | 340/152 R |
| 3,970,992 | 7/1976 | Boothroyd | 340/149 A |
| 3,990,558 | 11/1976 | Ehrat | 194/4 R |
| 4,016,405 | 4/1977 | McCune | 340/149 A |
| 4,023,012 | 5/1977 | Ano | 340/149 A |
| 4,023,013 | 5/1977 | Kinker | 340/149 A |
| 4,023,014 | 5/1977 | Goldberg | 340/149 A |
| 4,025,760 | 5/1977 | Trenkamp | 340/149 A |
| 4,091,448 | 5/1978 | Clausing | 235/379 |
| 4,123,747 | 10/1978 | Lancto | 235/380 |

OTHER PUBLICATIONS

Nat. Bor. of Standards–"Encryption Algorithm for Computer Data Protection", Federal Register, vol. 40, No. 52, Mar. 17, 1975, pp. 12134–12139.
IBM 3600 Financial Communication System, 3614 Programmers Guide and Reference Manual, 3614 with Controller Data, Version 5, 3600 Host Support, 1R3.0, First Ed. (Oct. 1976) IBM Publication GC66-022-0 File Number S 370-30.

*Primary Examiner*—Robert M. Kilgore
*Attorney, Agent, or Firm*—Henry E. Otto, Jr.; Shelley M. Beckstrand

[57] ABSTRACT

A transaction execution system having a multiple account data base and a plurality of transaction terminals in communication with the host. The terminals each include a keyboard, a display, document handling subsystems, a hardware control subsystem, a communication subsystem and a programmable control subsystem supervising the other subsystems. A user initiates a transaction request by inserting a card, which may have been issued by any of a plurality of cooperating card issuers or banks, into one of the terminals. The issuer identification number is read from the card, and used to search a table of card format and encryption key data. If the corresponding format and key data is located in the table, the terminal requests entry of a preassigned personal ID number through the keyboard. Verification data located on the card by format data from the table is encrypted in response to the key data from the table for comparison with the keyboard entered ID number. If the corresponding format and key data is not located in the table, the card data is sent to the host, which accesses a master table with the issuer identification number, and communicates back to the terminal the corresponding format and key data located in the master table. Once the terminal has checked for correspondence between encrypted verification data and the ID number, in response to format and key data from its own table or communicated from the host, additional transaction data is obtained via the keyboard. Upon command from the host, the host supplied format and key data is purged by the terminal at completion of the transaction, or else retained for future reference.

18 Claims, 10 Drawing Figures

TRANSACTION EXECUTION SYSTEM WITH SECURE ENCRYPTION KEY STORAGE AND COMMUNICATIONS

DESCRIPTION

CROSS REFERENCE TO RELATED APPLICATIONS

This application is an improvement of U.S. Pat. No. 3,956,615 for Transaction Execution System With Secure Data Storage and Communications by Thomas G. Anderson, William A. Boothroyd, and Richard C. Frey; the teachings of which are incorporated herein by reference.

TECHNICAL FIELD

This invention relates to transaction execution systems and more particularly to secure transaction execution systems having a central data base in communication with remote terminals which permit the execution of transactions such as the issuance of cash or the inter-account transfer of funds in response to a machine readable identification card issued by any one of a plurality of cooperating institutions.

BACKGROUND ART

For reasons of public convenience and economy a variety of systems have been developed for executing user requested transactions. One example is a check cashing machine. Such a machine reads data from a check inserted therein and issues cash equal to the amount of the check if the check is found to be in order. Other systems have been developed for use in conjunction with credit cards.

One credit card system stores credit card account information in a central data base. In response to the submission of an account number from a remote terminal, the system provides information relating to the account. For instance, the system may indicate that the card has expired, that it has been stolen or may indicate the dollar amount of available credit. After a transaction is completed, the system properly adjusts the stored information to account for the transaction.

Other credit card systems, which are frequently used by banks to extend their services during times of heavy business or business closure, permit the issuance of cash or the receipt of deposits through a terminal. Such a terminal typically includes a mechanism for receiving and reading information from a credit card, a keyboard, a display and document entry and exit apertures. The terminal may operate in conjunction with a data base or as a stand alone unit. Increased security for the issuance of cash without human intervention is attained by issuing a personal ID number with each credit card. A credit card transaction is then enabled only when an ID number corresponding to the account number read from the credit card is entered through the keyboard. This required correspondence prevents a thief or mere finder of a credit card from receiving cash from a terminal. If a terminal operates in conjunction with a data base the correspondence between account numbers and ID numbers can be chosen at random, but frequently the ID number is derivable from the account number in accordance with a predetermined code. In the latter situation, in order for the ID number to be chosen at random, such as by selection by the customer, an offset value is recorded on the card along with the account number, which offset value is selected such that when added or otherwise combined with the ID number derived from the account number in accordance with the predetermined code, the result is the ID number chosen at random. These predetermined relationships between ID number and account (and offset) data from the card permit a stand alone terminal to check the ID number by algorithmically relating the ID number to the account number. If credit cards issued by a plurality of cooperating banks are to be usable in a given terminal, all such banks must use the same code or algorithm, or otherwise provide for distinguishing the algorithmic relationship used in issuing ID numbers from account data. In one such system, each terminal is provided with an identical table of pseudo-random numbers which is pseudo-randomly addressed, first with the institution identifier and then by a logical combination of the output of the table with digits of the account number. In such a system, cards may be used which have been issued by various banks, but personnel of each bank has access in its terminals to the exact algorithm used by all other banks, and with knowledge of the bank identifier code can easily reconstruct ID numbers. In another system, a key-driven algorithm is provided for determining the relation between ID numbers and account numbers. In such a system, the account number and key number are combined using linear and non-linear operations to generate a check number for comparison with the ID number. The Anderson Pat. No. 3,956,615 is such a system. For cards issued by different banks to be used in the same terminals, however, all banks must use the same key number, and the account number must be located in the same field on all cards. In one improvement on the Anderson system, a table of encrypted keys is maintained in each terminal, containing the keys required for use in the key-driven algorithm for a plurality of cooperating banks, together with data specifying the location on the card data track of account, offset, and other data to be used in generating the check number for comparison with the ID code entered at the keyboard. However, this system is bound by storage limitations on the size of such a table, and each terminal is able to operate with cards issued only by a few of the potential cooperating institutions. Further, this system cannot accommodate cards for different types where institution ID and card status are identical—such as may occur when a bank is migrating its issued card base between two different plans.

While this table derived key driven credit card and ID number identification technique improves the security of cash issue terminals and permits a plurality of banks to cooperate in honoring cards issued by the others, there are still weaknesses that may be exploited to gain access to the large amounts of cash that are stored in the terminal or available in the accounts of cooperating banks for inter-fund transfer by operation of the terminal. One serious problem relates to the security of the encryption algorithm for terminals which are capable of stand alone operation, or even on-line operation. A large number of operators or maintenance personnel are required for the day-to-day support of cash issue terminals. For example, one or two people at each branch bank location may have internal access to the cash issue terminals. Often times these people may have access to the encryption key for normal maintenance. Alternatively, with only a little training, these people could learn to acquire the key by measuring electrical signals on the internal circuitry. Once an encryption key is acquired, and if the algorithm is known, a correspondence between a large number of account numbers and ID numbers could be generated. Then, with knowledge of the card format and location of verification and offset data on the card, correspondence between card data and random chosen ID numbers can be ascertained.

Another possible security problem arises from the transmission of account information and ID information between a terminal and a host data base. These transmissions often involve utility communication lines and are therefore subject to monitoring by a large number of people. Encryption is often used to improve communication security but anyone who is able to break the code or gain access to the code would be able to extract and compile a list of correspondence between credit card account information and ID numbers by monitoring these transmissions. In addition, by generating fake terminal communication traffic a person might gain access to the host data base and fraudulently transfer funds within data base accounts.

SUMMARY OF THE INVENTION

A transaction execution system in accordance with the invention includes a host data processing system having a data base of stored information for many accounts and a plurality of transaction terminals. In each terminal a table of encryption keys and card format information is maintained for a plurality of card issuers, which terminal table is searched in response to the issuer ID read from identification card presented to the terminal by an individual seeking authorization to perform a transaction. If the issuer ID is not found in the terminal table, the terminal communicates the card data to the host, which performs a similar search of the master table. The master table entry for the issuer is communicated to the terminal from the host for use in the transaction, and then may be purged from the terminal table. The host may also check a file of consumer information and instruct the terminal to retain the card, terminate the transaction, or take other action as indicated by that information. Further, the local host may communicate with yet another remote host to prime the local host data base with consumer information in anticipation of a transaction request from the terminal.

The encryption keys are stored in both the host and terminal tables in encrypted form, and double encrypted for communication.

The table of encryption keys and card format may be further accessible in response to card track status as determined by the terminal card reader.

BRIEF DESCRIPTION OF DRAWINGS

In the accompanying drawings forming a material part of this disclosure.

DISCLOSURE OF INVENTION

For further comprehension of the invention, and of the objects and advantages thereof, reference will be had to the following description and accompanying drawings, and to the appended claims in which the various novel features of the invention are more particularly set forth.

Figure 1:
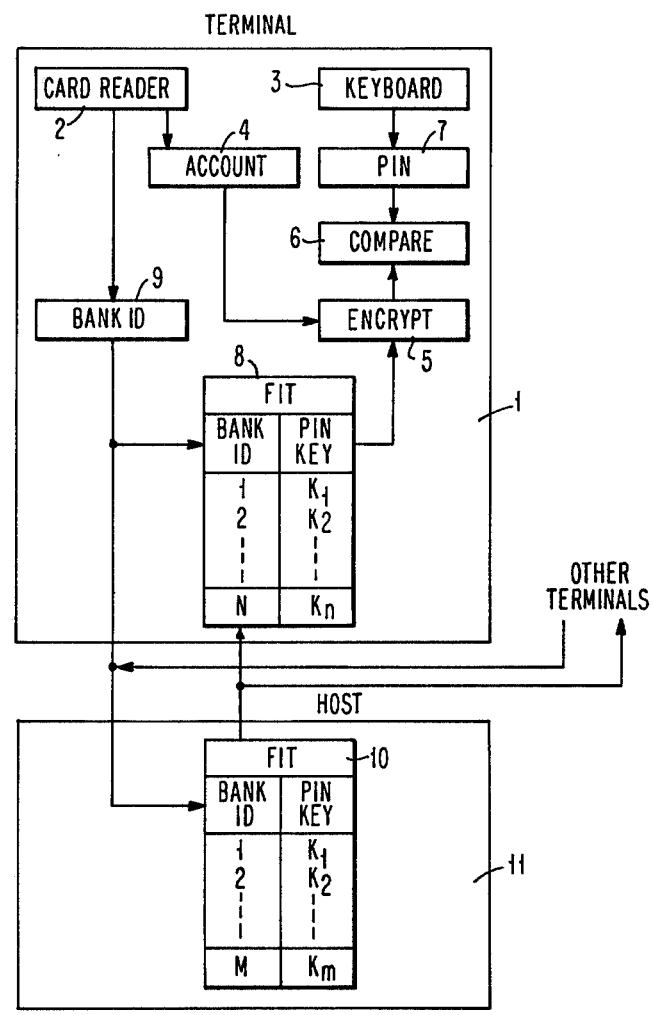
FIG. 1 is a functional block diagram representing a transaction execution system in accordance with the invention.

Referring to FIG. 1, the invention provides a system for authorizing a plurality of individuals to operate automatic teller machines or the like using personal identification cards issued by a plurality of banks or other card issuing authorities. Each terminal is provided with a Financial Institution Table (FIT) containing encryption keys for use in the verification of correspondence between data read from the identification card and that entered by the individual at a keyboard. The FIT is made virtually unlimited in size by providing access by the terminal to a master FIT at the host CPU when a card is presented at the terminal issued by an authority not having an entry in the terminal FIT.

Terminal 1 is, for example, one of a plurality of geographically dispersed automatic teller machines (ATM) in an interchange system. In such a system, a plurality of banks agree to honor in their own respective ATM's cards issued by the other banks.

An individual desiring to perform a banking transaction at ATM 1 inserts a magnetic encoded card into card reader 2 and enters his personal identification number (PIN) at keyboard 3. Account number 4, or other specified validation data, read from the card is converted by encryption logic 5 into a number which is checked at comparator 6 for correspondence with PIN 7. If this, and/or other checks are satisfied, the individual is permitted to proceed with the desired transaction.

Each bank, in issuing to its customers their identification cards and PINs, uses different PIN keys $k_1, k_2, \ldots k_m$. A PIN key is a multi-bit number used by the encryption logic in deriving from, say, an account number, a corresponding PIN. A subset of these PIN key $k_1, k_2, \ldots k_n$ (for an banks or different plans) is stored in FIT 8, a table within the terminal address space of storage which is searched or otherwise accessed by a bank identifier field 9 read by card reader 2, together with a track status designation, as will be explained more fully hereafter. Master or virtual financial institution table; FIT 10 (hereafter also referred to as VFIT) for all banks or plans, is maintained at host CPU 11 and is accessed by terminal 1 when its FIT 8 does not contain a control block corresponding to bank ID 9 read from the ID card of an individual requesting authorization to complete a transaction. Host 11 verifies that bank ID 9 corresponds to that of an interchange member, and communicates its FIT 10 entry to terminal 1, which may store that information, say, at location N, for use in th present and subsequent transactions. Host 11 may be an IBM 3601 Communication Controller for the 3600 Financial System, for a general purpose computer such as the IBM System/370—or any combination of hosts and subhosts, as will be more fully explained.

A "Control block" as herein used comprises whatever information is needed to test the authenticity of the card at the terminal; eg, when using an algorithm such as DES, it would include the encryption keys, bank ID, validation displacement and length data.

As will be described hereafter, FIT tables 8 and 10 constitute a plurality of control blocks and may include much more information—thus giving each bank M the flexibility of defining not only unique PIN keys, but also card formats, and authorization and transaction parameters.

Figure 2:
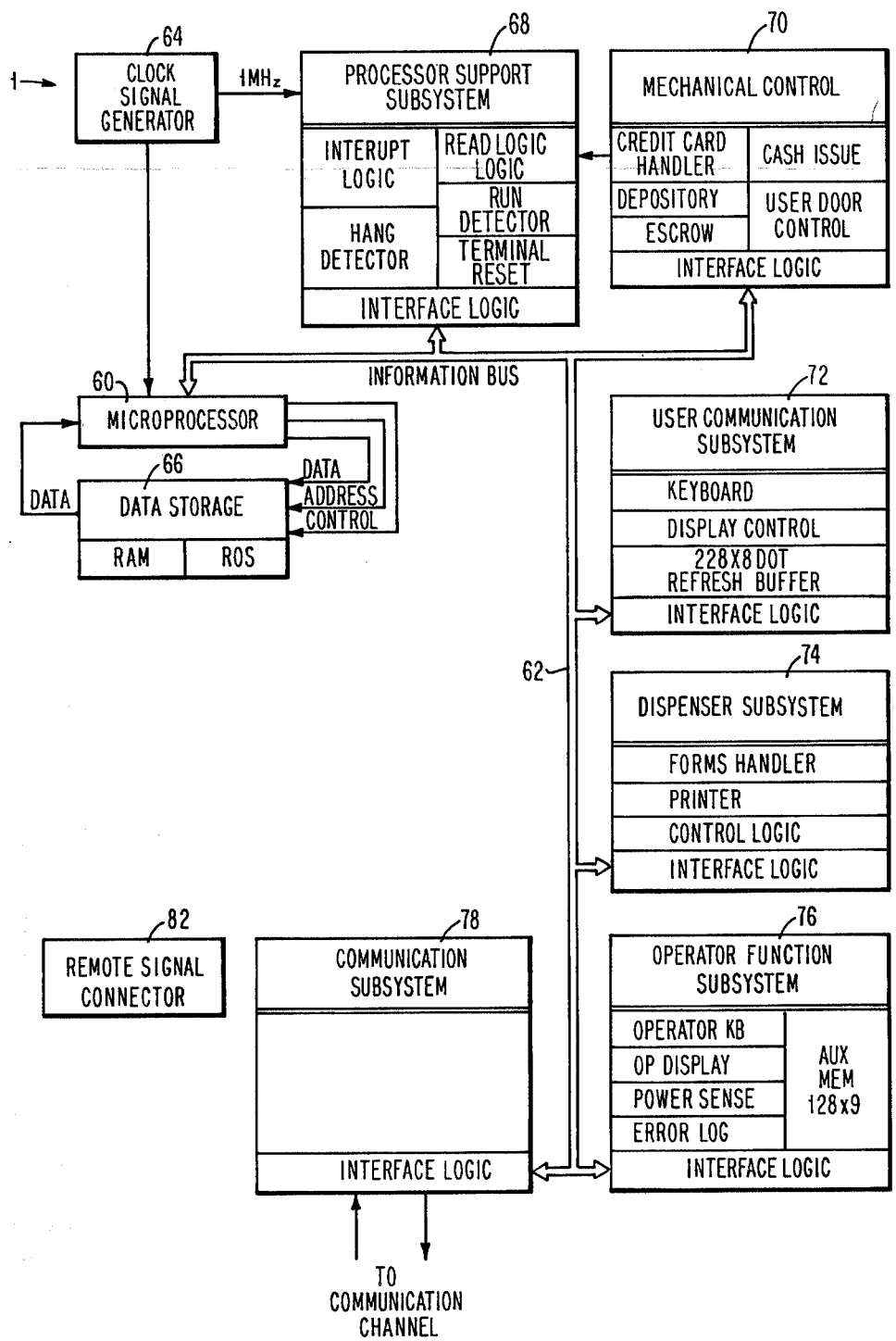
FIG. 2 is a functional block diagram representation of a transaction terminal used in the transaction execution system shown in FIG. 1.

Referring now to FIG. 2, the transaction terminal of the invention is an improvement with respect to that described in U.S. Pat. No. 3,956,615 by Anderson, et al for Transaction Execution System With Secure Data Storage and Communications, the teachings of which are incorporated herein by reference. FIG. 2 of Anderson 3,956,615 is repeated herein for ease of reference as FIG. 2 of the present application. Reference is made to Anderson 3,956,615 for a detailed description of FIG. 2. While the particular manner in which a transaction terminal 1 is implemented is not critical to the practice of this invention, a preferred embodiment is shown in FIG. 2. Terminal 1 is generally modular in nature and includes a programmable microprocessor 60 coupled to a plurality of terminal subsystems by an information bus 62. Microprocessor 60 is driven by a clock signal from clock generator 64 and is operationally connected to a data storage module 66 providing both electrically alternable random access memory (RAM) and read only storage (ROS). The read only storage portion of data storage 66 stores the various operating programs for the microprocessor 60. The random access memory portion of data storage module 66 provides a scratchpad for program execution, the storage of Keys and the FIT table 8. Reference is made to Anderson 3,956,615 for a description of the operational characteristics of processor support system 68, mechanical control subsystem 70, user communication subsystem 72, dispenser subsystem 74, operator function subsystem 76, and communication subsystem 78.

In the transaction authorization system of the invention, during the execution of a user transaction request, six communication messages between the terminal and the host may be required. These are explained in connection with FIGS. 3-5, and are the following:
VFIT TRANSACTION REQUEST
VFIT REPLY
VFIT STATUS
TRANSACTION REQUEST
REPLY
STATUS The transaction request, reply, and status messages are similar to those described in Anderson 3,956,615, modified in accordance with the teachings of this invention. The VFIT messages are substantially the same as the latter three, and are employed when transaction terminal 1 must communicate with host 11 to obtain a FIT entry.

The transaction execution system of the invention is adapted to support the Track 2 magnetic stripe identification card format of the American Bankers Association and/or Thrift Industry Association and the Track 3 Magnetic Card Format is proposed by International Standards Organization (ISO). The particular encryption algorithm which determines the correspondence between ID numbers and credit card information is not critical to the practice of the invention, except that that correspondence should be dependent on an encryption key. Whereas the encryption algorithm described in Anderson 3,956,615 is designated Lucifer, the system of the present invention is adapted for use with the National Bureau of Standards "Encryption Algorithm for Computer Data Protection", Federal Register, Vol. 40, No. 52, Monday, Mar. 17, 1975 (hereinafter referred to as DES.)

TRANSACTION REQUEST MESSAGE

To the Transaction Request Message described in Anderson 3,956,615, the following expanded function is provided in connection with the present invention. This message now accommodates the transmission of T-3 as well as T-2 card data along with the normal transaction information sent to the host/subhost for transaction processing. A message flag byte and PIN retry byte are added to flag special conditions detected by the terminal. T-2 and T-3 represent two separate data tracks on the magnetic stripe of an identification card readable by card reader 2.

Either or both T-2 and T-3 data may be transmitted in a Transaction Request. A data map field describing which T-3 fields to transmit as well as information on which tracts to send is found in an Issuer's PIN Table entry. The following data is included in a Transaction Request Message:

Message header
 L—indicates the message length, including the L field.
 N—indicates the transaction sequence number.
 C—indicates the message class/subclass (Transaction Request/normal or VFIT Transaction).
Variable Field (VAR)
 Sum of rollover bill counter for cash withdrawal requests; otherwise, transaction sequence number.
Consumer PIN
 The PIN entered by the consumer, or customer.
From Account Field
 The from-account field set from the consumer keyboard entry.
To Account Field
 The to-account field set from the consumer keyboard entry.
Special Transaction Number Field
Amount Field
Bill Mix Field
T-2 Card Data
Message Flag
 Bit 0 T-2 is good.
  1 T-3 is good.
  2 PIN retry count limit reached.
  3 PIN retry override failure. An Incomplete Transaction Request is sent with this bit set in the event of failure to enter correct PIN.
  4 Switch irregularity, indicating possible tampering with the card if switch irregularities are detected while the ID card is parked at the back of the card reader transport.

5 PIN Unchecked Flag, set whenever the terminal does not perform PIN verification.
6 Two Track card, indicating both tracks 2 and 3 were detected on the ID card.

PIN Retry
   Indicates the number of attempts the customer has made to enter the correct PIN before meeting the limit allowed.

T-3 Data Map
   Indicates which T-3 fields are being sent in the T-3 Card Data field. It is a copy of the T-3 Data Map found in the PIN Table entry for the ID Card of this transaction.

T-3 Card Data
   T-3 card data is transmitted if it is read successfully and the PIN Table entry indicates that it should be sent. All or certain fields of the track information may be transmitted as directed by the PIN Table Entry T-3 Data Map.

VFIT TRANSACTION REQUEST MESSAGE

This special Transaction Request subclass (Message Header, byte C, above) enables the terminal to make Virtual PIN Table entry requests of the host/subhost if the virtual PIN Table entry Institution option is selected (during initialization of the terminal at Initial Program Load, or IPL). The option specified whether a Virtual PIN entry request may be made and additionally specifies the amount of data to be sent for each track (T2, T3) selected. The host/subhost may respond by sending the appropriate PIN Table entry. The VFIT Transaction Request Message includes the following fields:

Message Header
Transaction Sequence Number
Message Flag
T-2 Data
T-3 Data

The Message Header and Message Flag fields are specified as above, for the Transaction Request Message.

TRANSACTION REPLY MESSAGE

The Transaction Reply Message enables the host/subhost to send T3 data to be written on the card, together with the action, display, and statement printer data. This message has the following fields:

Message Header
Counter
   The value of the rollover bill counters total.
Action
   This byte specifies the action to be taken by the terminal, including the following:
   0 Display pre-defined user message
   1 Display user message supplied in the display data field
   2 Print statement(s)
   3 Card removal time-out
   4 Transaction is authorized
   5 Retain credit card
   6 User acknowledgment requested
   7 Write T-3 data
Quantity 1
   The number of bills to be issued from hopper #1. Zero, for a single hopper terminal.
Quantity 2
   The number of bills to be issued (single hopper terminal), or the number of bills to be issued from currency hopper #2.
Display Data
   If present, contains the message data to be displayed. The message may either be the number of a predefined message or the text of a special message.
Statement Data
   If present, contains data to be printed on the transaction statement—the number of a predefined message, or an actual message, or both.
T-3 Data Length
T-3 Data Map
T-3 Data

VFIT TRANSACTION REPLY MESSAGE

This special Transaction Reply Message is to transmit the PIN Table entry when requested by the terminal. If the host/subhost cannot provide a PIN Entry, then the VFIT Transaction Reply will contain a null PIN Entry field. Otherwise, the PIN Entry provided will be retained in the terminal memory until a new entry is received unless bit 6 of the action byte is set to 1. The PIN entry is encrypted in the communication key KEY C or KEY B. This message has the following fields:

Message Header
Counter
   The rollover bill counters total maintained in the terminal and maintained by the host application program.
Action
   0 Display pre-defined user message.
   1 Display user message supplied in the display data-field.
   4 PIN entry included in message.
   5 Retain credit card.
   6 Purge PIN entry after processing.
Counter 1
Counter 2
Display Data
PIN Entry

STATUS MESSAGE/VFIT STATUS MESSAGE

The status messages are transmitted from the terminal to the host in response to the transaction reply messages, indicating the results of processing of data received in the reply messages. Various status bit definitions pertinent to the preferred embodiment of the invention relate to transaction processing irregularities and errors on a Virtual PIN Entry reply. Selected fields included in the status messages are as follows:

Message Header
Transaction Sequence Number
Counter 1
Length of Data Field
Counter 2
Status Data
   0 T-3 Write Failure
   1 Switch irregularity
   2 Virtual PIN Table entry error. This bit is set if:
      (1) the entry requested did not match the entry returned based on Issuer ID comparison and card type;
      (2) the entry returned was too long;
      (3) the value in the PIN length field is less than a given value;

(4) the entry returned had a length value of 0; or
(5) the entry had invalid field location specifications.

3 T-3 data error.

Figure 3:
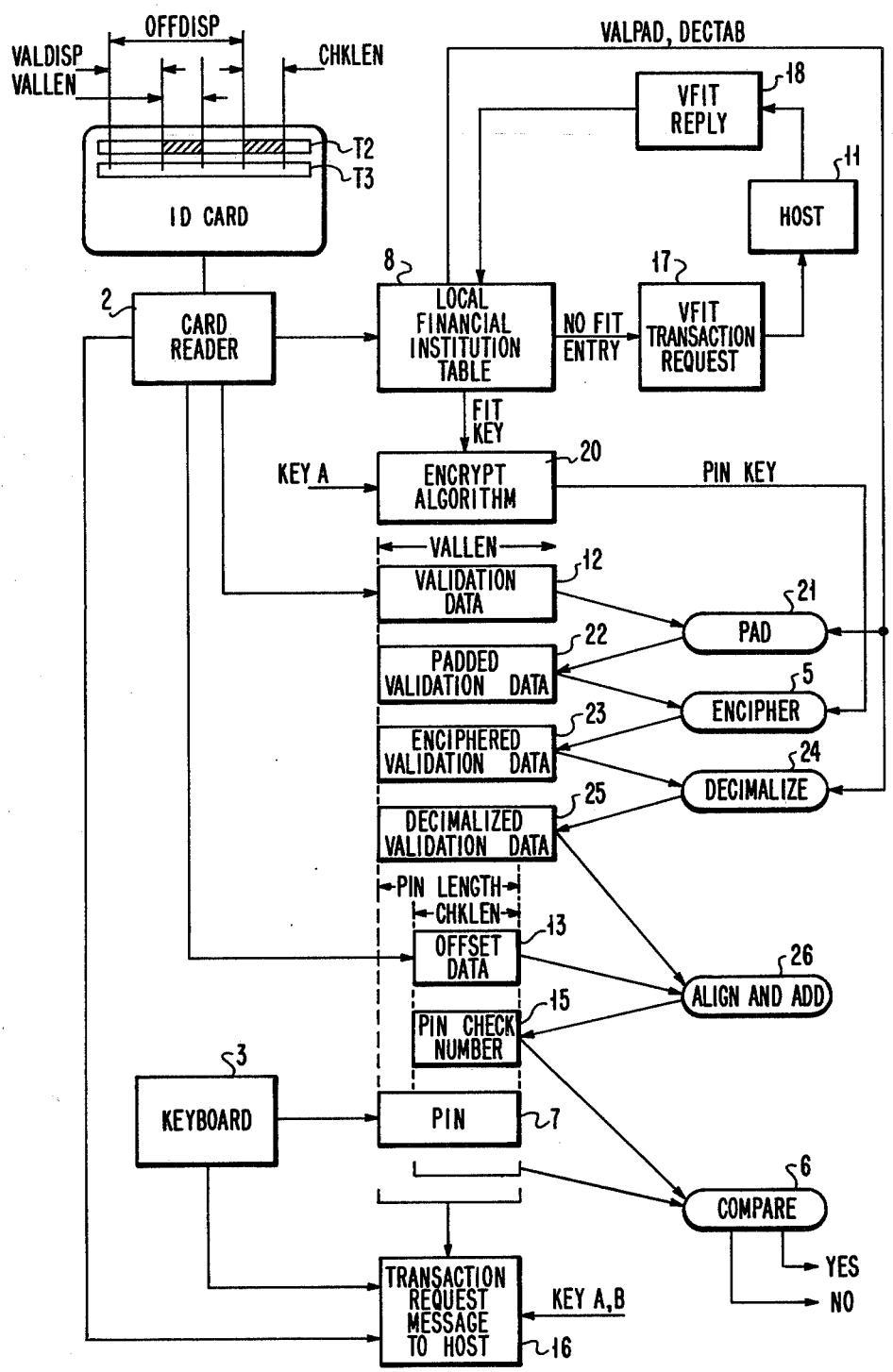
FIG. 3 is an operational block diagram representation of the manner in which a user initiated transaction request is initially processed by a transaction terminal.

Referring now to FIG. 3, an individual desiring to perform a transaction at terminal 1, inserts a magnetic encoded credit card into card reader 2. Data read from the card is stored in data storage 66, and utilized by microprocessor 60 to search local FIT 8, provide validation data 12 and offset data 13 for use in generating PIN check number 15, and data for inclusion in transaction request message 16 for transmission to host 11 by communication subsystem 78. The individual also, at an appropriate time in the processing of the transaction, is instructed to enter his PIN 7 at keyboard 3 for comparison with PIN check number 15 by comparator 6 within microprocessor 60.

After a consumer card has been entered properly into the card reader 2, the terminal 1 attempts to find a PIN Table (FIT) entry for the card issuing institution ID read from the card so that information governing the transaction may be found and the next step of verifying the PIN entered by the consumer may be performed.

Track processing by card reader 2 in cooperation with microprocessor 60 comprises reading the credit card to determine if it is processable based on track status. When a consumer enters a card into card reader 2, the tracks are read and, if necessary, reread in order to determine a track status for each track. The status may be good, bad, or undetectable. A card is considered usable if at least one track has a status of good.

Each unique issuer of an interchange system provides a PIN key to be used for PIN validation and PIN encryption. These PIN keys are provided by interchange member institutions in unique PIN table 8 entries transmitted from host 11 to terminal 1 during initialization (IPL). Alternatively, these entries may be held in host FIT 10 (FIG. 4) for virtual PIN processing.

Figure 8:
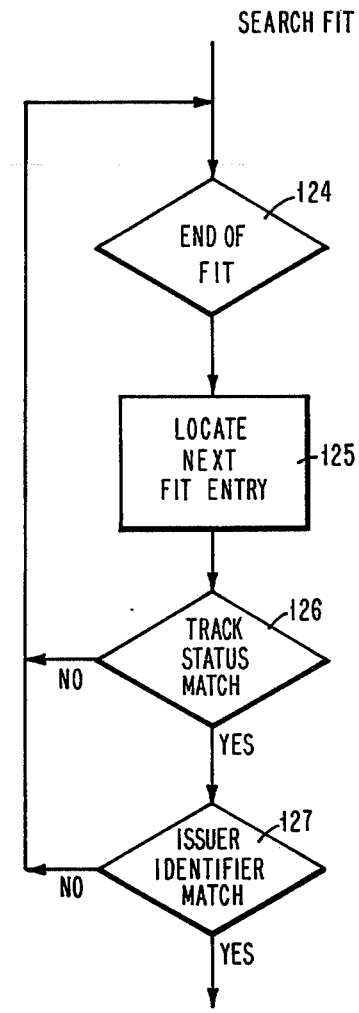
FIG. 8 is an operational flow chart of the Search FIT step of FIG. 7, illustrating also the steps performed in searching the subhost financial institution table of FIG. 4.

The process steps followed by microprocessor 60 in searching local FIT 8 are set forth in FIG. 8. These same steps may be followed by the host 11 in responding to a request for VPIN processing. The PIN Table 8, 10 search is an attempt to find the PIN table entry that corresponds to the card entered by the consumer, provided the card is processable. The PIN table search algorithm uses the Issuer Identifier (II) as a search argument and the credit card track status as a qualifier. The search argument can include, in accordance with the ISO draft standard T3 format, up to 20 contiguous digits including the card format ID, the industry ID, the standard issuer ID, and the consumer's primary account number. The FIT entry is set forth in FIG. 6, described below, and is searched as follows. If the Entry Type specified in the PIN table, or FIT, does not match the card type (e.g., T-2 is good and T-3 is undetected on the credit card but the PIN Table entry is T-3 only, T-2 or T-3 independent or T-2/T-3 combined), the PIN table entry is skipped. If the card type matches the PIN table entry tape, the definition in the PIN table entry is used to locate card data to be compared with the issuer ID in the PIN table entry. If they do not match, then the process is repeated with the next PIN table entry. When a match is found, the search is over and that PIN table 8 entry definition is used for the remainder of the consumer transaction processing. If a common entry is not found for this card type and if the Virtual PIN table entry option is not specified, the search terminates with the last entry in the PIN table 8. If no match is found, the credit card is returned to the consumer.

If a common (that is, corresponding) entry is not found in FIT 8, and the Virtual PIN table option is specified for terminal 1, microprocessor 60 assembles a VFIT Transaction Request message 17 for transmission to host 11, which will search host FIT 10, assemble a VFIT reply message 18 including the FIT table entry 19 storage by terminal 1 in FIT 8 or some other region of data storage 60. Thus, before requesting a VPIN table entry from the host/subhost 11, the VPIN entry saved internally from previous VPIN requests is checked for a match with the current ID card. If no entry is found in host FIT 10, that fact is indicated by bit four of the action byte in the VFIT transaction reply message.

After a PIN table 8 entry is found that corresponds to the consumer credit card data, the entry is examined to determine if PIN validation is to be performed by the terminal 1 or by the host 11. If host 11 PIN validation is specified, track status is checked, below, but no further PIN processing is performed at terminal 1. If track status indicates a bad track and the PIN table entry specifies "rejects cards with a bad track", the transaction is terminated, the card is returned to the consumer, and an appropriate message displayed. If the card has no bad tracks or if the PIN table entry specifies "process cards with a bad track", PIN processing proceeds.

In encrypt algorithm 20, the encrypted PIN key from PIN table 8 is decrypted using Key A to generate the PIN key for use in encipher step 5, described below. PIN check, or validation, data 12 and offset data 13 may be located anywhere on either track T-2 or T-3. If terminal PIN validation is specified by the PIN table entry, their location is described by the PIN table entry. PIN processing by terminal 1 involves a master key, (card data, data from the FIT entry selected for the card, and keyboard data entered by the customer.) The Master Key is sent to terminal 1 from host 11 in a Load Master Key command. If no Load Master Key command has been executed, the A Key, entered at the operator/CE panel 76, is used as the master key. Validation data 12 could be the customer's account number or any number the financial institution wants to use to identify the customer. Offset data is optional, and may be selected in such a way that the PIN to be entered by the customer and the validation data may be specified independently.

The following parameters from the FIT entry provide the length, displacement, and padding specifications for the card data; a decimalization table; and encryption key required to perform the PIN check:

VALDISP specifies the displacement of the validation data field from the first data digit of the card data.

VALLEN specifies the number of digits contained in the validation data field.

VALPAD specifies the digit to be used to pad the validation data if it contains less than 16 digits.

OFFDISP specifies the offset data field displacement from the first data digit of the card data.

CHKLEN is a parameter which specifies the number of digits contained in the offset data field, the number of digits to be checked in the customer entered PIN, and the minimum number of digits allowed in the customer entered PIN.

DECTAB is a table of 16 decimal digits to be used to convert the enciphered validation data to a decimal number.

EPINKEY is the encrypted PIN key (enciphered in the master key) which is to be used to encipher the validation data.

The following data is entered from the keyboard 3:

PIN is the personal identification number entered on the keyboard 3 by the customer.

PIN Length is the number of digits in the customer entered PIN.

Referring now to FIG. 3, terminal 1 performs the off-host PIN check as follows:

1. The validation data 12 is obtained from the card using VALDISP to find the location and VALLEN to determine the length.
2. If VALLEN, which indicates the number of digits in the validation data field, is less than 16, validation data 12 is padded in pad step 21 on the right to 16 digits using the digit specified by VALPAD to yield padded validation data 22.
3. A PIN Key is obtained in one of two ways:
    If the EPINKEY (or, FIT Key) parameter is specified in the FIT table entry, the value in EPINKEY is deciphered using the master key.
    If the EPINKEY parameter is not specified in the FIT table entry, the master key is used as the PIN key.
4. Padded validation data 22 is encyphered by encipher algorithm 5 using the PIN Key to yield enciphered validation data 23.
5. The enciphered validation data 23 is converted to decimal digits in decimalize routine 24 using DECTAB to yield decimalized validation data 25. Each hexidecimal digit of the enciphered validation data 23 is replaced by a decimal digit from DECTAB. The decimal digit selected is the digit whose displacement (0–15), in DECTAB, corresponds with the value of the hexidecimal digit (0–F) being replaced in validation data 23.
6. Offset data 13 is obtained from the card using OFFDISP to find the location and CHKLEN to determine the length. If OFFDISP=255 (X'FF'), all zero digits are used for the offset data.
7. In block 26 offset data 13 is aligned with the decimalized validation data 25 such that the left most digit of the offset data 13 is displaced zero or more digit positions to the right of the left most digit of the decimalized validation data. The number of digit positions of this displacement is obtained by subtracting CHKLEN from the PIN Length.
8. The offset data digits 13 are added, digit-by-digit, modulo 10, to the decimalized validation data digits 25 with which they have been aligned. The result is PIN check number 15.
9. The PIN check number 15 is compared in comparator 6, digit-by-digit, from the right with digits of the customer entered PIN 7. For a successful comparison all digits of the PIN check number 15 must be the same as the corresponding digits of the customer entered PIN 7. If the customer entered PIN Length is greater than CHKLEN, the extra, left-most (first entered) digits of the customer entered PIN 7 are not checked: any digit values are acceptable for these extra digits.

If comparison 6 is successful, terminal 1 proceeds with the transaction by assembling data, and encrypting part of it into a transaction request message 16 to host 11. If comparison 6 is not successful, terminal 1 allows the customer zero or more retries, as specified by the RETRY customization parameter. Terminal 1 may return the card and terminate the transaction, sending no message to host 11. Alternatively, Terminal 1 may send an Invalid PIN Transaction Request message to host 11, and await a transaction reply directing terminal 1 to return or retain the card and, perhaps, display a message to the customer.

Figure 4:
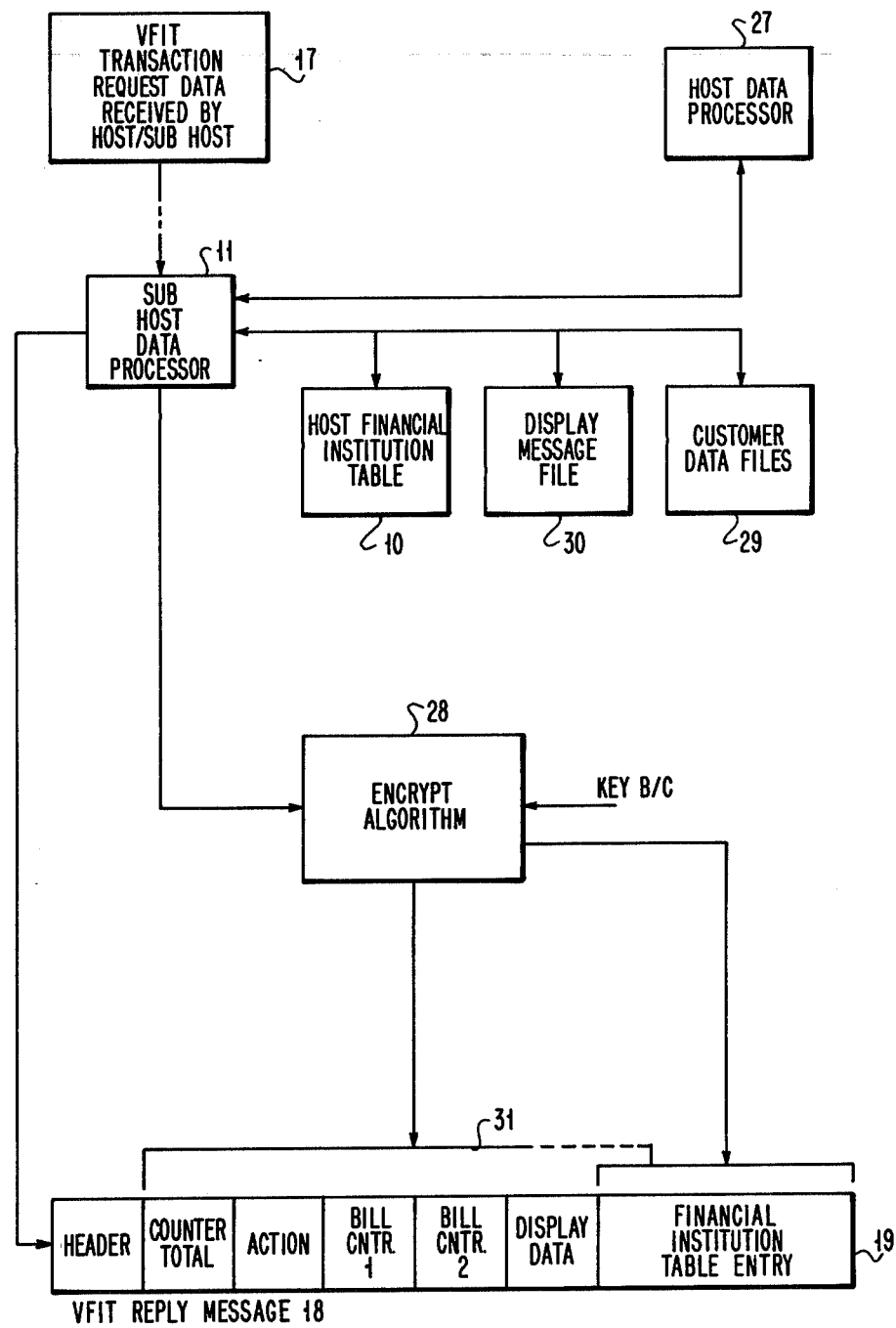
FIG. 4 is a functional block diagram representation of subhost/remote host data processor used in the transaction execution system shown in FIG. 1.
Figure 5:
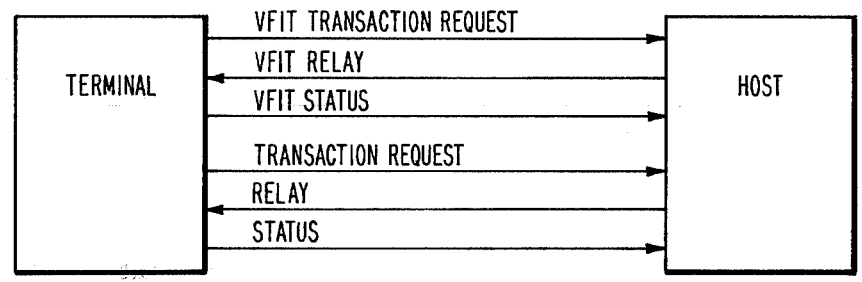
FIG. 5 is a functional block diagram representation of the transaction execution system, showing the communication messages between the transaction terminal and host or subhost data processor in the course of a typical transaction.

Referring now to FIG. 4, the host/subhost is illustrated with respect to the processing of a VFIT transaction request 17 from terminal 1. VFIT transaction request message 17 is decrypted, according to the procedure taught in connection with FIG. 4 of Anderson 3,956,615. Using track status and issuer identification, as previously discussed with respect to the search of local FIT table 8 (and in accordance with the procedure illustrated in FIG. 8), subhost data processor 11 searches subhost FIT 10 to locate the corresponding FIT entry 19 for encryption in encrypt algorithm 28 using communication Key B or C. Encrypt algorithm 28 may be implemented in application programming executed by subhost data processor 11, or by digital hardware logic in accordance with the Data Encryption Standard (DES) of the National Bureau of Standards, as described in Federal Register, Vol. 40, No. 52, Monday, Mar. 17, 1975.

Using customer account identification data provided in the track data from the ID card in VFIT transaction request message 17, subhost data processor 11 may search its customer data files 29, and based upon information stored there instruct terminal 1 through an action bit in VFIT reply message 18 to retain the card, or terminate or approve the transaction. Similarly, subhost data processor may place display data into VFIT reply message 18 from display message file 30. Encrypt algorithm 28 further encrypts a portion 31 of VFIT reply message 18, which in the absence of the optional display data may result in double encryption of a portion of the FIT entry 19. As the PIN key stored in FIT table 10 has been previously encrypted using the master key, this results in a possible triple encryption of FIT entry 19 using two different keys.

Subhost data processor 11 may also be connected with host data processor 27, which may be central host for the bank, a cental host for all members of an interchange system, or the host or subhost of another member of the interchange accessible by subhost 11 through an appropriate switching communication link.

Subhost data processor 11 provides means for communicating a VFIT reply message 18 to terminal 1 including the corresponding entry in FIT 10 for the institution ID and track status obtained via VFIT transaction request message 17. In parallel with processing of data in terminal 1 to generate a transaction request message, subhost 11 may access host data processor 27 to obtain the consumer file for loading into its customer data file 29 in anticipation of receipt of a transaction request from terminal 1 for the individual identified in the data previously communicated in the VFIT transaction request message. Thus, subhost data processor 11 need only maintain customer data files for its own issued cards, or even merely assemble transaction data for its own customers into a customer data file 29 for subsequent batch processing into other account files. When the transaction request message is subsequently received from terminal 1 by subhost 11, all data required to process the request is available in its files 29—whether there originally or obtained from host 27.

By a further embodiment of the invention, the terminal FIT 8 could store entries for the various plans only of the bank which owns or otherwise controls terminal 1, and all FIT entries for cooperating banks maintained at host FIT 10—thus enhancing the security of the system with respect to access by tellers or others to the FIT 8. The FIT entry for a given bank need only be retained in terminal 1 during execution of a single transaction, and then purged therefrom.

By a further embodiment of the invention, a bank may migrate its issued card base from one plan to another. During such migration, it is common for cards having identical institution ID and track status to pertain to two different plans. Terminal 1, not having the facility to check other data in the encoded track, would be unable to distinguish therebetween. Under these circumstances, the issuing bank could require that its FIT entries only be maintained at subhost 11, requiring terminal 1 to communicate via VFIT transaction request messages to process all transactions requested by customers for that issuer. At subhost 11, application programming is provided to check all or some other portion of data read from the card for a field that identifies the plan, thus enabling the subhost 11 to provide to terminal 1 the appropriate FIT entry, together with a command to purge it from terminal 1 storage upon completion of the transaction.

As will, therefore, be apparent from the above, terminal 1 may be connected with host 11, which in turn may be a subhost connected to a further remote host 27—allowing security of data and efficiency in processing and storage by distributing FIT tables 8, 10 and customer account files, such as file 29 to many locations. By priming data file 29 with account data from host 27 while replying to terminal 1 with VFIT reply message 18, host 11 is enabled to respond quicker to the anticipated transaction request from terminal 1.

Host 11 may be, for example, an IBM 3601 controller or an IBM System/370 data processing system. Host 27 may be an IBM System/370. Host 11 is referred to as a subhost when it is connected to a remote host 27—otherwise as a host. In either case, the terms host and subhost may be used interchangeably when used in the context of the interface to terminal 1.

Figure 6:
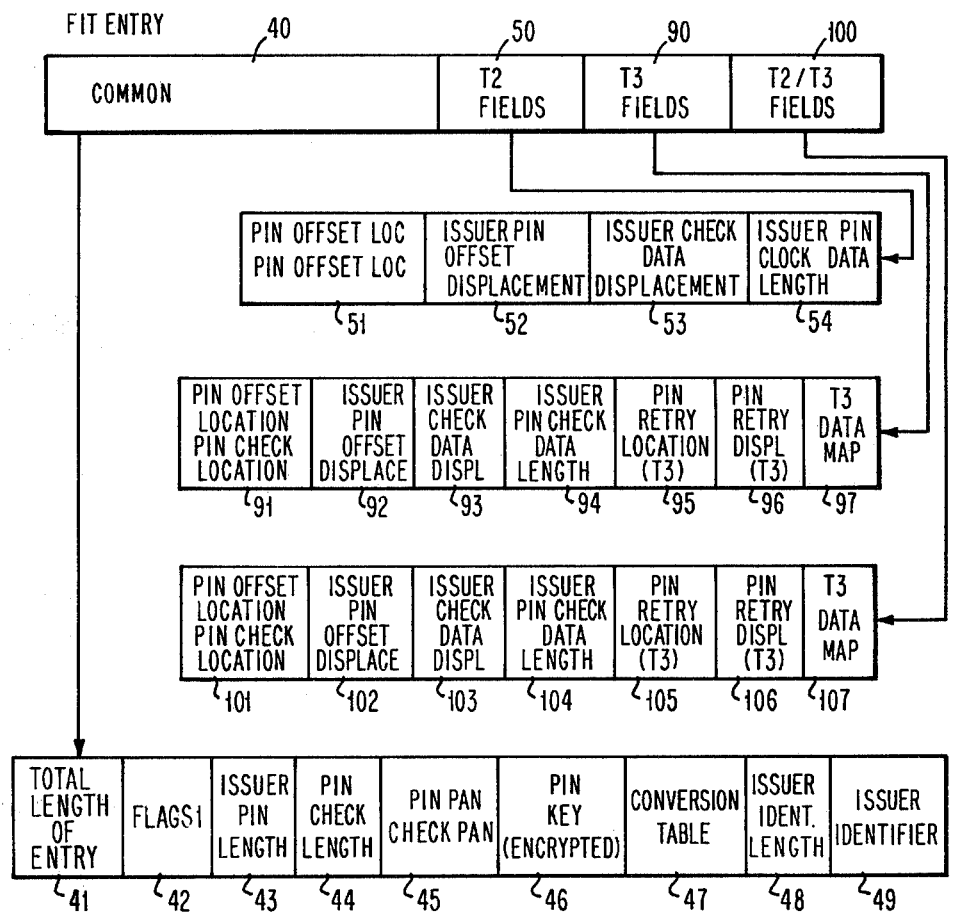
FIG. 6 is a functiional block diagram representation of a Financial Institution Table stored in the transaction terminal and host/subhost data processor.

Referring now to FIG. 6, the PIN table entry will be described. There are three basic types of PIN Table entries: T-2 (T-2 only or T-2 independent), T-3 (T-3 only or T-3 independent), and T-2/T-3 combined. Entries can appear in any order in the table. Entries of different types may have the same Issuer ID although T-2 and T-3 independent are mutually exclusive from T-2/T-3 combined. In addition to these Entry types, a Common Pin Table Entry may be specified. The Common Entry, if specified, is the last in the PIN Table and is used for credit cards for which no PIN Table Entry match has been found. The PIN Table Entry contains all information necessary for consumer ID verification except the location of the Issuer ID which is obtained from the customization image, provided to terminal 1 by host 11 prior to any transactions. A separate subentry in FIT tables 8, 10 is required for each card type supported (T-2, T-3, T-2/T-3). Following is a description of fields 41-49 of common portion 40:

| Common Portion | |
| --- | --- |
| Length of entry 41 | Total length of pin entry including this byte. |
| Flags 42 | Bit 0 = 1 Track 2 only supported |
| | Bit 1 = 1 Track 3 only supported |

| Common Portion -continued | |
| --- | --- |
| | Bit 2 = 1 Track 2 ind. supported |
| | Bit 3 = 1 Track 3 ind. supported |
| | Bit 4 = 1 T-2/T-3 supported |
| | Bit 5 = 0 II is on track 2 |
| | = 1 II is on track 3, use only when bit 4 = 1 |
| | Bit 6 = 0 Process a T-2/T-3 card with 1 bad track |
| | Bit 6 = 1 Reject card with 1 bad track, use only when bit 4 = 1. |
| Issuer PIN length 43 | Max. PIN Length accepted by issuer! Minimum allowed is four: |
| PIN check length 44 | Number of digits of PIN to be validated by terminal. If = 0, no PIN verification is performed. |
| Issuer PIN pad/Check pad digits 45 | Bits 0-3 = Pad digit to be used in the terminal, if the consumer entered PIN is less than 16 digits. To pad on the right, the consumer-entered PIN to 16 digits for DES encryption. |
| | Bits 4-7 = Pad digit to be used if the issuer-supplied PIN check data is less than 16 digits. To pad on the right the PIN check data from the card to 16 digits for DES encryption. |
| PIN Key 46 | An issuer provided key for use in PIN encryption and PIN validation. The PIN key is encrypted in the master key. |
| Decimal Translation Table 47 | An issuer-provided table used for PIN validation. Encryption of the credit card PIN check data produces 16 hexadecimal digits which must be converted to decimal digits. Each hexadecimal digit is replaced by the decimal digit whose position in this table (0-15) corresponds to the value (O-F) of the hexadecimal digit being replaced. The translation is performed, offset values are then added, if required, to the translated results, and then a comparison is made of the calculated PIN and the consumer's PIN. |
| Issuer ID Length 48 | Length of ID field in bytes. |
| Issuer ID 49 | Contains an Issuer ID used for PIN table entry selection. An entire Issuer ID field of X'FF' designates the Common PIN Table entry. It must be the last entry in the PIN Table. |

Following is a description of fields 51-54 of T-2 -only portion and T-2 independent field 50:

| | |
| --- | --- |
| PIN offset & PIN check location 51 | Bits 0-3 = Number of field separators to PIN offset T-2. Bits 4-7 = Number of field separators to PIN check data, T-2. |
| Issuer PIN Offset displacement 52 | Displacement from the field separator value, specified in field 10 of the PIN Entry, to the PIN offset on the track. If this field is X'FF', no offset is applied. |
| Issuer PIN check data displacement 53 | Displacement from the field separator value, specified in field 51 of the PIN Entry, to the PIN check data on the card. Used as a basis for correlation with the PIN entered by the consumer. |
| Issuer PIN check data length 54 | Length of PIN check data provided on card. If less than 16 digits, |

-continued

| | pad digits are added on the right by the terminal to provide an 8-byte field for DES encryption. |
|---|---|

Following is a description of fields 91–97 of T-3 only portion and T-3 independent field 90:

| PIN offset and PIN check location 91 | Bits 0-3 = Number of field separators to PIN offset, T-3. Bits 4-7 = Number of field separators to PIN check data, T-3. |
|---|---|
| Issuer PIN offset displacement 92 | Displacement from the field separator value, specified in field 91 of the PIN Entry, to the PIN offset on the track. If this field is X'FF', no offset is applied. |
| Issuer PIN check data displacement 93 | Displacement from the field separator value, specified in field 91 of the PIN Entry, to the PIN check data on the card. Used as a basis for correlation with the PIN entered by the consumer. |
| Issuer PIN check data length 94 | Length of PIN check data provided on card. If less than 16 digits, pad digits are added on the right by the terminal to provide an 8-byte field for DES encryption. |
| T-3 PIN Retry location 95 | Bits 0-3 = Reserved. Bits 4-7 = Number of field separators to field on card containing T-3 PIN retry count. |
| T-3 PIN Retry displacement 96 | Displacement of T-3 retry count within field on card. |
| T-3 data map 97 | Indicates which fields in T-3 are to be sent in the Transaction Request message. |

Following is a description of fields 101–107 of T-2/T-3 portion 100:

| PIN offset and PIN check location 101 | Bits 0-3 = Number of field separators to PIN offset on track specified in field 102. Bits 4-7 = Number of field separators to PIN check data on track specified in field 103. |
|---|---|
| Issuer PIN offset displacement 102 | Bit 0 = PIN offset track location. Bits 1-7 = Displacement from the field separator value specified in field 101 of the PIN Entry, to the PIN offset on the track. If this field is X'FF'FF', no offset is applied. |
| Issuer PIN check data displacement 103 | Bit O = PIN check data track location. Bits 1-7 = Displacement from the field separator value, specified in the field 101 of the PIN Entry, to the PIN check data on the card. Used as basis for correlation with the PIN entered by the consumer. |
| Issuer PIN check data length 104 | Length of PIN check data provided on card. If less than 16 digits, pad digits are added on the right by the terminal to provide an 8-byte field for DES encryption. |
| T-3 PIN Retry 105 | Number of field separators to field on card containing T-3 PIN Retry count. |
| T-3 PIN Retry Displacement 106 | Displacement of T-3 Retry within the field on card. If this field is C'FF', the retry count in the customer options will be used. |
| T-3 Data Map 107 | Indicates which fields in T-3 are to be sent in the Transaction Request Message. |

Best Mode for Carrying Out the Invention

Figure 7A:
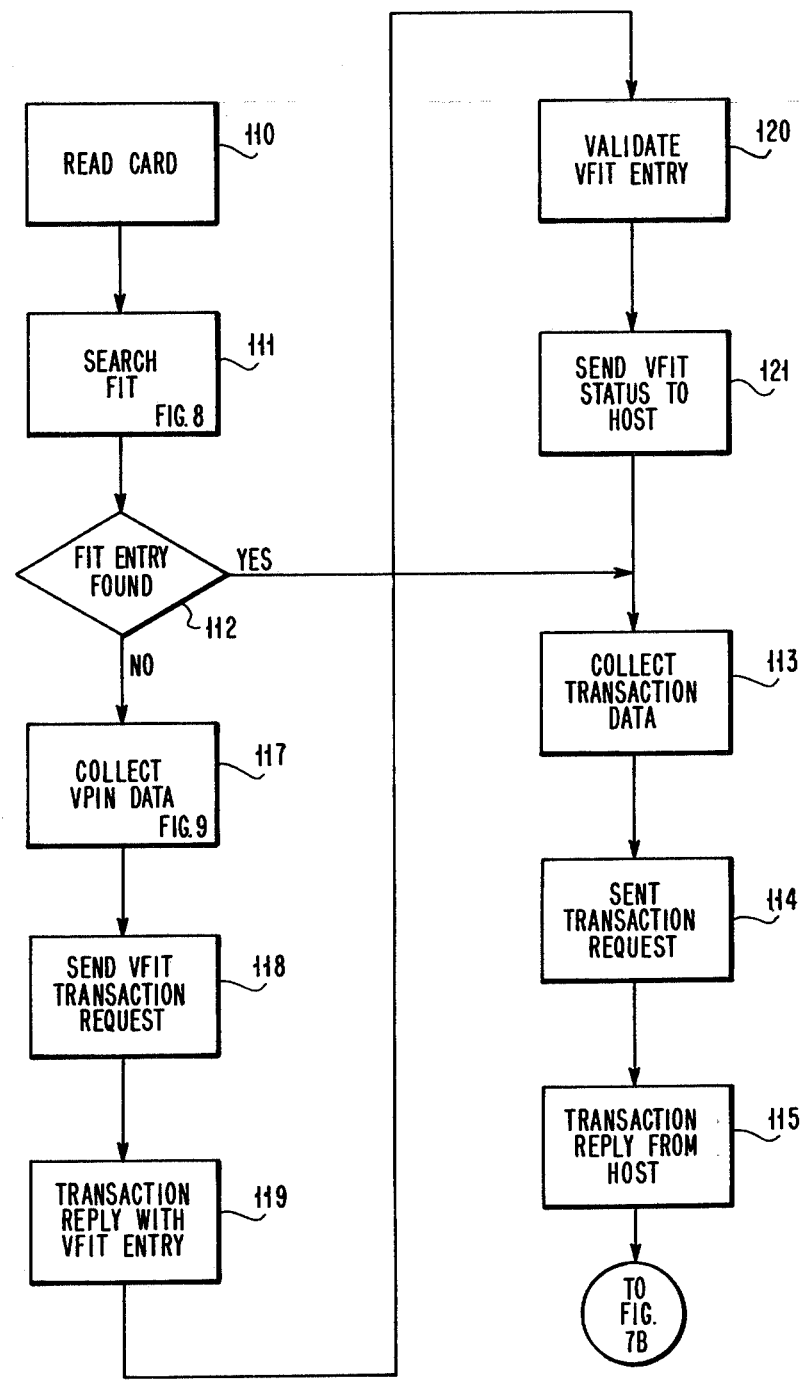
FIGS. 7A and 7B are an operation flow chart representation of the steps performed by the transaction terminal in accordance with the invention.
Figure 7B:
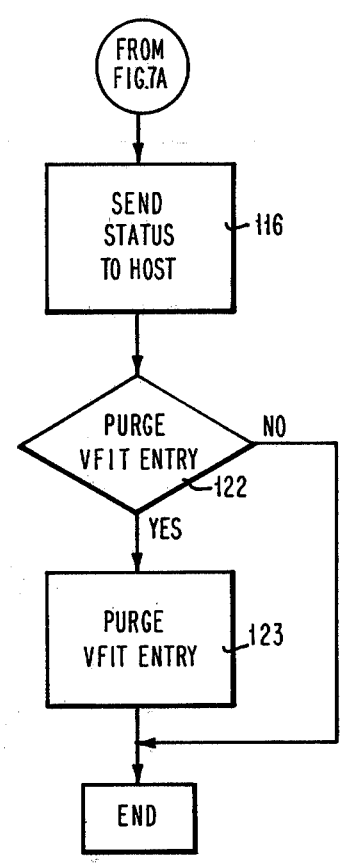

Referring now to FIGS. 7A and 7B, the operation of the transaction execution system of the invention in accordance with a best mode for carrying it out is illustrated. The customer ID card is read 110, and based upon track status and issuer identification a search 111 is made of local FIT table for the corresponding FIT entry. If a FIT entry is found 112, transaction data is collected 113 from the card and from that entered at the keyboard to prepare a transaction request message for communication 114 to the host. At the host, the customer account files are checked, and a transaction reply message returned 115 to the terminal including instructions on further execution of the transaction. The terminal executes the instructions, and returns to the host with a status message 116 indicating to the host the action taken so that the customer account files can be appropriately updated.

Figure 9:
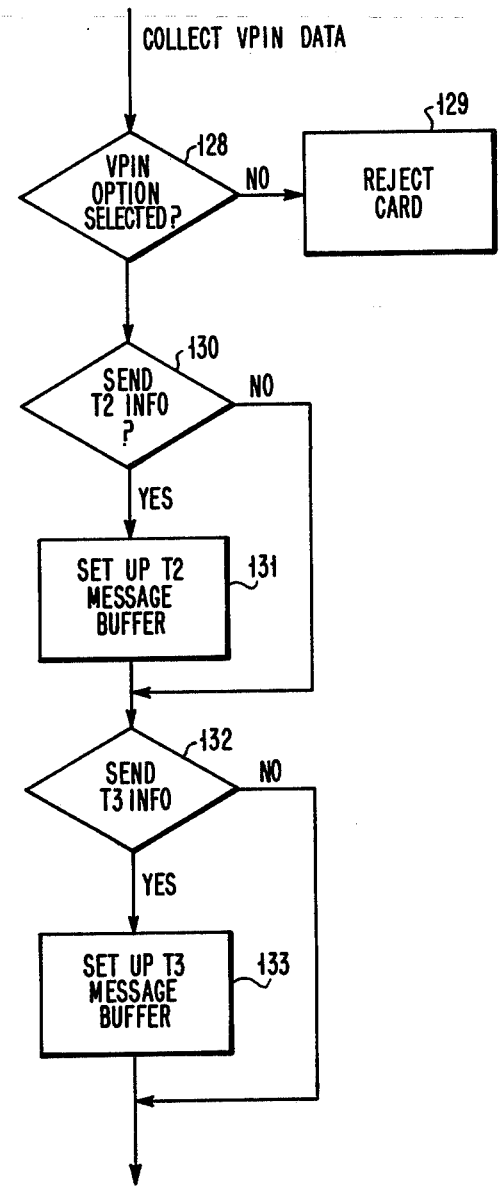
FIG. 9 is an operational flow chart of the Collect VPIN Data step of FIG. 7.

In the event that a FIT entry corresponding to the customer ID card data had not been found during the local FIT search, the terminal collects 117 the data required for a VFIT transaction request message to the host. That VPIN data collection procedure is set forth in the flow chart of FIG. 9, which illustrates the selection 103-133 of T-2 and T-3 data in response to a control 128 provided previously from the host selecting the VPIN option.

The terminal communicates 118 the VFIT transaction request to the host, which assembles from its files a transaction reply 119 with an encrypted VFIT entry. The terminal validates 120 the VFIT entry, and communicates 121 to the host in a VFIT status message that the VFIT entry matches that requested and is otherwise accepted. If not instructed in VFIT transaction reply message to retain the card and/or terminate the transaction, the terminal proceeds to collect the transaction data and execute the request. If instructed to do so in the VFIT transaction reply message, at the conclusion of the transaction execution, the terminal purges 122, 123 from its local FIT table the VFIT entry received from the host.

INDUSTRIAL APPLICABILITY

The transaction execution terminal and system of the invention provides a self-service facility for customers of a financial institution. By using the terminal, many banking functions can be transacted without the aid of a teller and that twenty-four hours a day. A magnetic stripe card with encoded identification data is issued to the customer by a financial institution, and used by the customer to initiate a transaction at the terminal. His identity is further verified by a personal identification number (PIN), which he enters at the terminal keyboard.

Sensitive data, including the identification data, is enciphered to help preserve its security. Encryption, and the subsequent decryption, is accomplished with an encryption algorithm and the institutions' secret encryption keys. The system encryption algorithm may be selected to be the National Bureau of Standard's Data Encryption Standard proposed algorithm, referred to as DES.

Terminals may be used in an interchange environment; that is, one in which the card holders from multiple, participating, card-issuing institutions can use the same terminal.

A table of data used while processing the customer's transaction is maintained in the terminal, with an entry for many of the cooperating card issuing institutions accessed by the institution identifier read from the customer's card. If a search of that table does not find a mating entry, a request message is transmitted to the host requesting a mating entry from the master table maintained there. After that master table entry is used by the terminal, it may be purged—thus further enhancing the security of the system. The host (or subhost) consumer files may be primed for handling a transaction request from the terminal.

While the preferred embodiments of the invention have been illustrated and escribed, it is to be understood that such does not limit the invention to the precise constructions herein disclosed and the right is reserved to all changes and modifications coming within the scope of the invention as defined in the appended claims.

We claim:

1. A transaction terminal connectable to a host having a virtual storage means with a plurality of issuer unique control blocks, the transaction terminal comprising:
   terminal storage means for storing at least one issuer unique control block, each such block including an encryption key, and including at least one but less than all of the plurality of control blocks in the virtual storage means;
   card reader means for reading encoded data on an identification card presented to the terminal by an individual, said encoded data including issuer identification data and card verification data;
   means responsive to said issuer identification data for searching said terminal storage means for a corresponding control block;
   means for communicating said encoded data to the host when a corresponding control block is not found in said terminal storage means and for receiving from the virtual storage means at the host a corresponding control block for writing into said terminal storage means; and
   means responsive to said encryption key data from said corresponding control block for encrypting said card verification data to generate a card check number.

2. The transaction terminal of claim 1, further comprising:
   means for receiving from said individual a personal identification number (PIN);
   means for comparing said card check number and said PIN and for generating an authorization signal; and
   means responsive to said authorization signal for approving the transaction requested by said individual.

3. A transaction terminal which is connectable to a host that has a virtual storage means with a plurality of issuer unique control blocks, the transaction terminal comprising:
   terminal storage means for storing a plurality of issuer unique control blocks, each said block including identification card track format data and corresponding to but being a subset of the plurality of control blocks in the virtual storage means;
   card reader means for reading encoded data on an identification card presented to the terminal by an individual, said encoded data including issuer identification data and card verification data;
   means responsive to said issuer identification data for searching said terminal storage means for a corresponding control block;
   means for communicating said encoded data to the host when a corresponding control block is not found in said terminal storage means and for receiving from the host a corresponding control block for writing into said terminal storage means; and
   means responsive to said track format data for locating said card verification data for generating a card check number.

4. The transaction terminal of claim 3, further comprising:
   means for receiving from said individual a personal identification number (PIN) selected by said individual;
   means for comparing said card check number and said (PIN) and for generating an authorization signal; and
   means responsive to said authorization signal for approving the transaction requested by said individual.

5. The transaction terminal of claim 1 or 3 further comprising means responsive to a command received from said host in connection with communication from the host of a control block for purging the control block received from said host prior to completion of execution of the transaction.

6. The transaction terminal of claim 2 or 4 further comprising means responsive to card format data in said corresponding control block for locating offset data in said encoded data and for applying said offset data to one of said card check number or said PIN prior to the comparison of said numbers by said comparing means.

7. The transaction terminal of claim 1 or 3, wherein each control block further includes transaction authorization parameter data, and further comprising transaction execution means responsive to said transaction parameter data for approving a transaction requested by said individual.

8. The transaction terminal of claim 7 wherein the transaction authorization data specifies the location in said encoded data for accumulating the number of failures of comparison between said card check number and PIN entered by said individual.

9. The transaction terminal of claim 1 or 3 further comprising:
   register means for storing a communication encryption key entered by a teller at said terminal or received by said terminal from said host; and
   means for encrypting data to be communicated to said host with said communication encryption key.

10. The transaction terminal of claim 1 further comprising:
    register means for storing a master encryption key entered by a teller at said terminal or received by said terminal from said host; and
    means responsive to said master encryption key for encrypting data read from said control block to produce said encryption key in clear text for encrypting said card verification data.

11. A transaction terminal which is connectable to a host that has a virtual storage means with a plurality of issuer unique control blocks, the transaction terminal comprising:

terminal storage means for storing a plurality of issuer unique control blocks, each said block containing an encryption key and corresponding to but being a subset of the plurality of control blocks in the virtual storage means;

input means for receiving from an individual issuer identification data, account verification data, and data selected by the individual;

means responsive to said issuer identification data for searching said terminal storage means for a corresponding control block;

means for communicating said issuer identification data to said host when a corresponding control block is not found in said terminal storage means and for receiving from the host a corresponding control block for writing into said terminal storage means;

means responsive to said encryption key for encrypting one of said account verification data or selected data to generate a card check number; and means for comparing said card check number with the other of said account verification data or selected data to generate an authorization signal enabling execution of the individual's requested transaction.

12. The transaction terminal of claim 1 or 3 further comprising:

means responsive to a command received from said host in response to communication to said host of said encoded data for selectively retaining said identification card.

13. The transaction terminal of claim 11 wherein said input means includes a card reader for reading an identification card presented thereto by said individual; and further comprising:

means responsive to a command received from said host in response to communication to said host of said issuer identification data for selectively retaining said identification card.

14. A transaction execution system comprising:

a host data processing system including a data base store for storing a plurality of issuer unique control blocks, each said block including transaction request processing parameters;

a transaction execution terminal coupled in communication with the host data processing system, the terminal comprising:

storage means for storing at least one but not all of said plurality of issuer unique control blocks, each said block including transaction request processing parameters identical with that of the corresponding control block in said data store;

input means for receiving from an individual issuer identification data;

means responsive to said issuer identification data for searching said storage means for a control block corresponding to said issuer identification data; and means for communicating said issuer identification data to said host system when a corresponding control block is not found in said storage means and for receiving from said host a corresponding control block from said store for writing into said storage means.

15. The transaction execution system of claim 14 wherein said terminal communicating means communicates to said host data processing system account identification data when a corresponding control block is not found in said storage means; and said host data processing system further includes within its data base store means for storing individual account status data, and means responsive to said account identification data for searching said account status data for further transaction processing parameters.

16. The transaction execution system of claim 15 further comprising a remote host data processing system including account status data storage means for storing individual account status data; and said host data processing system further includes means for communicating said account identification data received from said terminal to said remote host system when the transaction processing parameters for processing a transaction with respect to the identified account is not found in the search of the account status data stored in said storage means.

17. The transaction execution system of claim 16 wherein said host system communicates said corresponding control block to said terminal means together with a control word, and wherein said terminal further comprises means responsive to said control word for purging its storage means of said control block upon completing said transaction.

18. A method of providing approval of credit card transactions, comprising the steps of:

providing a plurality of terminals, each connected to a common host data processing system;

storing in a store in the host system a plurality of control blocks each unique to a different issuer of credit card and each including an encryption key unique to that issuer;

storing in a storage in each terminal the control block of such issuers whose transactions are approvable at such terminal, the control blocks stored in each terminal being less than all of those stored in the store in the host system;

reading encoded issuer identification data and card verification data from a credit card presented at a particular terminal by a user;

searching the storage in the particular terminal for a control block corresponding to the issuer identified;

communicating the encoded data to the host system if a control block corresponding to the issuer identified is not found in the storage of the particular terminal;

receiving from the store in the host system a control block corresponding to the issuer not identified in the terminal storage and writing same into the terminal storage;

encrypting the card verification data in response to the encryption key data; and generating a card check number in response to such encryption.

* * * * *